United States Patent Office 2,784,128
Patented Mar. 5, 1957

2,784,128

LAMINATING COMPOSITION AND LAMINATE MADE THEREFROM

Juel P. Schroeder, Springfield, N. J., assignor to Union Carbide and Carbon Corporation, a corporation of New York No Drawing. Application March 24, 1954,
Serial No. 418,467

15 Claims. (Cl. 154—43)

This invention relates to new compositions of matter and to the method of making the same. More particularly, the compositions comprising this invention relate to compositions of polymeric materials which are useful in the production of laminates.

In the production of laminates, the general practice has been to impregnate sheets of paper or cloth with a solution of a bonding resin in a volatile solvent. The volatiles are then driven off by heating, and the impregnated sheets are then stacked up and pressed into a laminate. In a resin system comprising acrylic acid copolymer-polyepoxide combinations, satisfactory impregnation of a laminate base with a resin is difficult. Impregnations with solutions of these resins are not feasible because of the high molecular weight of the copolymers. Also, the time required to dissolve the resins is long and, in order to obtain a satisfactory working viscosity, the solutions must be very dilute, that is, on the order of 10 to 15 percent solids. This results in a very low resin pickup per dip, requiring repeated dryings and re-impregnations. In addition, the large volumes of solvent involved are uneconomical and cumbersome.

Impregnations of laminate bases with resin emulsions is a far superior process since satisfactory viscosities are obtained at high solids contents, and no expensive solvent is involved in the preparation of the laminates, nor is there a long dissolving time necessary to dissolve the resin in the solvent.

While there are many distinct advantages involved in impregnating laminate bases with resin emulsions over resin solutions, one disadvantage generally recognized when impregnating a laminate base with a resin emulsion is that a powerful wetting agent must be added in order to obtain satisfactory impregnations of laminate bases. As a result of the use of these powerful wetting agents, the final laminated products usually have poor electrical properties and high water absorption values due to the hydrophylic nature of the strong wetting agent.

Quite unexpectedly, it has been discovered that polyacrylic acid, polymethacrylic acid and their salts impart excellent wetting properties to the resin emulsions of this invention and yield final laminated products prepared from such emulsions which have superior electrical properties and high water resistance.

Broadly, this invention relates to thick, stable, creamy emulsions, particularly adapted for use in preparing laminates which possess good electrical properties and good water resistance.

The emulsions which are useful in the preparation of the final laminated products comprise polymers consisting essentially of styrene and acrylic acid in admixture with 1,2-epoxy ethers of polyhydric alcohols and polyhydric phenols and containing, in addition, a small amount of a preformed polyacrylic acid as a wetting agent.

More particularly the emulsions of this invention comprise (a) a polymer consisting essentially of styrene and acrylic acid, (b) from 1 to 10 parts by weight based on the polymer of a preformed polyacrylic acid and (c) a 1,2-epoxy containing polyether of a polyhydric phenol, such as, for example, the diglycidyl ethers of various dihydric phenols.

The use of a polyacrylic acid as the wetting agent is unique in the production of laminates because the polyacrylic acid effectively disappears during the curing operation by cross-linking with the resin through the carboxyl and epoxy groups, and provides laminated products which have good electrical properties and water resistance.

The following Table I compares the effect of emulsions containing polyacrylic acid as a wetting agent and emulsions containing conventional wetting agents on the properties of fiberglas-based laminates bonded with cross-linked styrene-acrylic acid (90:10) copolymer.

Type I of Table I represents an emulsion prepared by the gradual addition of a mixture of styrene, acrylic acid and the diglycidyl ether of bis(4-hydroxy phenyl) propane to a rapidly stirring aqueous solution of a redox type catalyst ($K_2S_2O_8$—$NaHSO_3$) at a temperature of from 60° C. to 65° C. The emulsions so produced required the addition of a conventional wetting agent in order to impregnate paper or fabric satisfactorily. The wetting agent employed was a commercially available alkyaryl polyether sulfonate. Laminates prepared from these impregnated materials had very poor electrical properties and high water absorption values because of the wetting agent and the high concentration of electrolytes which were present.

Type III of Table I represents a mixture similar to Type I except that an amount of polyacrylic acid is used as the wetting agent during the impregnation of the laminate base. A sufficient excess of the diepoxy compound was added to cross-link this polyacrylic acid into the resin during cure. Thus, in effect, the wetting agent disappeared in the final laminate and did not exhibit the undesirable hydrophylic properties characteristic of wetting agents.

TABLE I

| Resin Dispersion | Type I Emulsion | Type III Emulsion | Dioxane Solution of carefully purified Resin [a] |
|---|---|---|---|
| Emulsifying Agent | | polyacrylic acid. | |
| Wetting Agent | alkylaryl sulfonate. | do | |
| Resin content of Laminate (percent). | 41 | 44 | 41. |
| ASTM* Water Absorption (percent). | 3.8 | 1.1 | 2.2. |
| Caustic Absorption (percent)[b] | 4.6 | 1.9 | 2.1. |
| Dielectric Properties after 24 hours' immersion in water: | | | |
| Power factor $10^6$ cycles/sec | 0.297 | 0.022 | 0.019. |
| Dielectric Const. $10^6$ cycles/sec. | 6.9 | 3.7 | 3.4. |

[a] Electrolytes and emulsifier removed by exhaustive washing of coagulated copolymer with water prior to dissolving in doixane and addition of diepoxy compound.
[b] After 24 hours' immersion in 10% aqueous NaOH at 25° C.
* American Society for Testing Materials.

It will be seen that the Type III emulsion gives a laminate having approximately the same water absorption, caustic absorption and electrical properties as one bonded with a resin from which the electrolytes and wetting agent were removed by thorough washing with water. This indicates that very little unreacted polyacrylic acid remains after curing.

The polymers consisting essentially of styrene and acrylic acid suitable for use in this invention comprise mainly copolymers of styrene and acrylic acid containing from 5 to 50 percent copolymerized acrylic acid. Copolymers containing from 10 to 20 percent copolymerized acrylic acid are preferred. The styrene and acrylic acid copolymers may be further modified to yield other desirable properties in the final laminated products by the addition of another monomer which is polymerizable with styrene and acrylic acid and such compounds include, for example, acrylonitrile and methacrylonitrile.

The amount of polyacrylic or polymethacrylic acid suitable for use in preparing the laminating compositions is an amount sufficient to provide a stable emulsion while at the same time imparting good wetting properties to the laminating composition. It has been discovered that an amount of polyacrylic acid or polymethacrylic acid sufficient to impart these desirable properties above described is an amount of from 1 to 10 parts of polyacrylic acid or polymethacrylic acid per 100 parts of charged monomers (styrene and acrylic acid). Preferably an amount not to exceed 5 parts of polyacrylic acid or polymethacrylic acid per 100 parts of charged monomers is preferred. Alternatively, from 1 to 10 percent by weight based on the polymer of a polyacrylic acid can be used.

Types of 1,2-epoxy ethers of polyhydric phenols suitable for use in the practice of this invention are those prepared by reacting a dihydric phenol with epichlorhydrin in an alkaline solution. Any of the various dihydric phenols can be used in preparing the glycidyl ethers and include mononuclear phenols such as, for example, resorcinol, catechol, hydroquinone and the like or polynuclear phenols like 2,2-bis(4-hydroxyphenyl)propane, bis(4-hydroxyphenyl)methane, 2,2-bis(4-hydroxyphenyl)butane, 2,2-bis(4-hydroxy-2-methylphenyl)propane, 2,2-bis(4-hydroxy-2-tertiary-butylphenyl)propane, bis(dihydroxynaphthyl)methane, 1,5-dihydroxynaphthalene and the like.

The amount of 1,2-epoxy-containing polyether of a polyhydric alcohol effective for use in providing acceptable laminates in combination with the styrene-acrylic acid copolymer is an amount in the range of from about 0.25 to 1.25 of epoxy equivalent per equivalent of carboxyl group in the styrene-acrylic acid-polyacrylic acid system. It is preferred, however, to use 1.0 equivalent of epoxy per equivalent of carboxyl group contained in the styrene-acrylic acid-polyacrylic acid system.

The following Table II illustrates the physical properties of glass cloth-based laminates bonded with an emulsion containing a styrene-acrylic acid copolymer, polyacrylic acid and the diglycidyl ether of bis(4-hydroxyphenyl)propane wherein the equivalents of the diglycidyl ether employed have been varied.

The process of this invention is directed to a method of preparing stable laminating emulsions and the laminates producible therefrom. More particularly, the process of preparing thick, stable, creamy emulsions comprises preparing an emulsion of acrylic acid and styrene containing preformed polyacrylic acid as the emulsifier and a polymerization catalyst, heating the emulsion at a temperature in the range of 40° C. to 100° C. to effect copolymerization of the acrylic acid and styrene, cooling the emulsion and adding a 1,2-epoxy containing polyether of a polyhydric phenol. If desired, the polyether may be charged to the reaction vessel along with the monomeric reactants.

The stable emulsions prepared by the process of this invention are heat curable, and when applied to a base article and heated, a tough hard coating having good electrical properties and superior moisture resistance is formed. These desirable properties may also be obtained if a base article such as fabric or paper is dipped into the emulsion and cured by heating to an elevated temperature in the range 100° C. to 200° C. The emulsion compositions of this invention are also useful as adhesives, and when these emulsion compositions are cast on a sheet of glass and cured, they form films which exhibit good adhesive qualities even after immersion in water for a period of time.

The following examples will serve to illustrate the practice of the invention in preparing the laminating emulsions and laminates of this invention:

*Example I*

Polyacrylic acid was prepared as follows:

| Formulation: | Parts by weight |
|---|---|
| Water | 900 |
| Acrylic acid | 100 |
| 30% aqueous $H_2O_2$ | 15 |

This mixture was heated with stirring at a temperature of from 90° C. to 100° C. for two hours to give a viscous 10% aqueous solution of polyacrylic acid. This was used as an emulsifier in the preparation of a styrene-acrylic acid copolymer as described below:

| Formulation: | Parts by weight |
|---|---|
| Water | 200 |
| 10% aqueous polyacrylic acid | 50 |
| Styrene | 90 |
| Acrylic acid | 10 |
| Potassium persulphate | 0.3 |
| Aqueous ammonia (sp. gr.=0.90) | 2.25 |

The mixture was heated with stirring at a temperature of 90° C. to 95° C. for two hours to give a creamy, stable emulsion containing 25.1% total solids (84% yield). After cooling to room temperature, 40 parts of 2,2-bis(4-hydroxyphenyl)propane having an epoxy equivalent weight of 185–200 grams/gram mole epoxy was stirred in. This was the amount theoretically equivalent to the

TABLE II

| Experiment | A | B | C | D | E |
|---|---|---|---|---|---|
| Copolymer | | | Styrene-acrylic acid (90:10) | | |
| Epoxy equiv | 0.5 | 0.25 | 0.5 | 0.25 | 1 |
| Catalyst (percent based on resin) | 0.5(KOH) | 0.5(KOH) | 0.5(KOH) | 0.5(KOH) | 0.5(KOH) |
| Resin content of Laminate (percent) | 47 | 50 | 54 | 52 | 46 |
| Plasticizer (percent based on resin) | none | none | 5 | 5 | none |
| Flexural Strength (p. s. i.) | 28,100 | 24,000 | 28,100 | 28,200 | 34,000 |
| Water Absorption (percent) | 2.8 | 5.6 | 3.5 | 3.2 | 0.7 |
| Caustic Absorption (percent) | 6.2 | 8.6 | 4.8 | 6.3 | 2.0 |
| Methyl ethyl ketone Extractables (percent) | 1.1 | 1.2 | 4.2 | 4.4 | 2.3 |
| Dielectric Properties as received: | | | | | |
| Power factor— | | | | | |
| $10^3$ cycles/sec | 0.064 | 0.079 | 0.074 | 0.057 | 0.036 |
| $10^6$ cycles/sec | 0.011 | 0.008 | 0.009 | 0.007 | 0.009 |
| Dielectric Const.— | | | | | |
| $10^3$ cycles/sec | 3.7 | 3.7 | 3.5 | 3.5 | 4.0 |
| $10^6$ cycles/sec | 3.3 | 3.3 | 3.2 | 3.1 | 3.8 |
| After immersion in $H_2O$ for 24 hrs. at 25° C.: | | | | | |
| Power Factor— | | | | | |
| $10^3$ cycles/sec | 0.726 | 0.895 | 0.290 | 0.328 | 0.098 |
| $10^6$ cycles/sec | 0.170 | 0.272 | 0.108 | 0.109 | 0.020 |
| Dielectric Const.— | | | | | |
| $10^3$ cycles/sec | 17.5 | 46.3 | 9.5 | 9.9 | 4.9 |
| $10^6$ cycles/sec | 4.5 | 5.4 | 4.1 | 4.1 | 4.0 | total acrylic acid in the mixture. Just before use, 0.72 part of potassium hydroxide dissolved in a small amount of water was added as a catalyst for the subsequent curing reaction.

Strips of glass cloth were dipped in the above emulsion and air dried. The impregnated cloth was cut into squares which were laminated at 160° C. and 1000 p. s. i. pressure in a hydraulic press. The laminate was cured further at 150° C. for seven and one-half hours. The resulting panel was light-colored, smooth-surfaced and well-bonded.

*Example II*

A resin emulsion and a glass cloth-based laminate therefrom were prepared by the process described in Example I, above, with the exception that 5 percent (based on resin) of tricresyl phosphate was added to the emulsion before impregnation.

*Example III*

A styrene-acrylonitrile-acrylic acid terpolymer was prepared in emulsion as follows:

Formulation: Parts by weight
- Water _____ 200
- 10% aqueous polyacrylic acid_____ 50
- Styrene _____ 70
- Acrylonitrile _____ 20
- Acrylic acid_____ 10
- Potassium persulfate_____ 0.6
- Aqueous ammonia (sp. gr.=0.90)_____ 2.25

This mixture was heated with stirring at a temperature of 80° C. to 95° C. for three hours to give a stable emulsion. The yield of polymer was 93 percent. After cooling to room temperature, 40 parts of the diglycidyl ether of 2,2-bis(4-hydroxyphenyl)propane having an epoxy equivalent weight of 185–200 grams/gram mole epoxy and 0.71 part of potassium hydroxide, in a small amount of water, were dispersed in the emulsion.

A glass cloth-based laminate was prepared from this emulsion in the same manner as described in Example I, above.

The following Table III compares some of the physical properties of the laminates prepared in Examples I, II and III with a laminate prepared with a conventional wetting agent and a laminate prepared by solution impregnation. The resin in the latter had been carefully purified to remove hydrophylic substances and electrolytes.

What is claimed is:

1. A thick, stable, creamy aqueous emulsion composition particularly adapted for use in preparing laminates having superior electrical properties and moisture resistance which comprises a styrene-acrylic acid polymer, a 1,2-epoxy-containing polyether of a polyhydric phenol and a small amount of a wetting agent consisting of a polyacrylic acid.

2. An aqueous emulsion composition according to claim 1 in which the styrene-acrylic acid polymer is a styrene acrylic acid copolymer containing from 5 percent to 50 percent copolymerized acrylic acid.

3. An aqueous emulsion composition according to claim 1 in which the 1,2-epoxy-containing polyether of a polyhydric phenol is a diglycidyl ether of a di-phenol.

4. An aqueous emulsion composition according to claim 1 in which the 1,2-epoxy-containing polyether of a polyhydric phenol is the diglycidyl ether of 2,2-bis(4-hydroxyphenyl)propane.

5. An emulsion composition according to claim 1 in which the wetting agent is polyacrylic acid.

6. An aqueous emulsion composition containing (a) 90 parts of styrene copolymerized with 10 parts of acrylic acid, (b) from 1 to 10 parts of polyacrylic acid and (c) from 0.25 to 1 equivalent of the diglycidyl ether of 2,2-bis(4-hydroxyphenyl)propane per equivalent of carboxyl present in the composition.

7. An emulsion composition containing (a) a copolymer of styrene and acrylic acid containing from 5 parts to 50 parts of acrylic acid, and 95 to 50 parts of styrene, (b) from 1 to 10 parts of a polyacrylic acid and (c) from 0.25 to 1 equivalent of a diglycidyl ether of a di-phenol per equivalent of carboxyl group present in the composition.

8. An emulsion composition containing (a) a copolymer of styrene and acrylic acid containing 10 percent acrylic acid, (b) from 1 to 10 percent by weight based on the copolymer of polyacrylic acid and (c) one equivalent of the diglycidyl ether of 2,2-bis(4-hydroxyphenyl)-propane per equivalent of carboxyl group present in the composition.

9. A heat-curable, laminating emulsion adapted to provide a laminate possessing superior electrical properties and moisture resistance upon curing at elevated temperatures and pressure which comprises (a) a polymer consisting essentially of styrene and acrylic acid, (b) from 1 to 10 percent by weight based on the polymer of a polyacrylic acid and (c) a diglycidyl ether of a di-phenol.

TABLE III.—GLASS CLOTH BASED LAMINATES BONDED WITH ACRYLIC ACID COPOLYMER-DIGLYCIDYL ETHER RESINS

| No. | | Example I | Example II | Example III |
|---|---|---|---|---|
| Copolymer | | Styrene acrylic acid (90:10) copolymer | | |
| Method of applying resin to cloth | Emulsion | Dioxane Solution. | Emulsion | Emulsion | Emulsion. |
| Wetting Agent | Alkylaryl polyether sulfonate. | None [a] | | Polyacrylic acid | |
| Plasticizer | | | | Tri cresyl phosphate. | |
| Resin Content of Laminate (Percent) | 41 | 41 | 44 | 41 | 46. |
| Bonding Strength (lbs.) | | | 1,470 | | 1,875. |
| Water Absorption (Percent) [b] | 3.8 | 2.2 | 1.1 | 0.6 | 0.7. |
| Caustic Absorption (Percent) [c] | 4.6 | 2.1 | 1.9 | 0.7 | 2.0. |
| Dielectric Properties after immersion in water for 24 hours at 25° C.: | | | | | |
| Power Factor— | | | | | |
| $10^3$ cycles/sec | 0.99 | 0.205 | 0.155 | 0.083 | 0.098. |
| $10^6$ cycles/sec | 0.297 | 0.019 | 0.022 | 0.014 | 0.020. |
| Dielectric Constant— | | | | | |
| $10^3$ cycles/sec | 86.0 | 4.7 | 5.0 | 4.5 | 4.9. |
| $10^6$ cycles/sec | 6.9 | 3.4 | 3.7 | 3.9 | 4.0. |

[a] The resin was washed thoroughly with water and then methanol to remove wetting agent and electrolytes before being dried and dissolved in the dioxane.
[b] Sample ⅛ x 1 x 3 inches immersed in water for 24 hours at 25° C.
[c] Sample ⅛ x 1 x 3 inches immersed in 10% aqueous NaOH for 24 hours at 25° C.

10. A heat-curable, laminating emulsion adapted to provide a laminate possessing superior electrical properties and moisture resistance upon curing at elevated temperature and pressure which comprises (a) a styrene-acrylonitrile-acrylic acid terpolymer, (b) from 1 to 10 percent by weight based on the polymer of a polyacrylic acid and (c) a diglycidyl ether of a di-phenol.

11. A laminate characterized by superior moisture resistance and electrical properties which comprises a laminate base impregnated with an emulsion comprising (a) a polymer consisting essentially of styrene and acrylic acid, (b) from 1 to 10 percent by weight based on the polymer of a polyacrylic acid and (c) a diglycidyl ether of a di-phenol.

12. A laminate according to claim 11 in which the polymer of (a) is a styrene-acrylic acid copolymer containing from 5 percent to 50 percent acrylic acid.

13. A laminate according to claim 11 in which the di-phenol of (c) is 2,2-bis(4-hydroxyphenyl)propane.

14. A laminate according to claim 11 in which a polyacrylic acid of (b) is polyacrylic acid.

15. A laminate according to claim 11 in which the laminate base is glass cloth.

References Cited in the file of this patent

UNITED STATES PATENTS

| | | |
|---|---|---|
| 2,161,481 | Marks | June 6, 1939 |
| 2,604,464 | Segall et al. | July 22, 1952 |
| 2,639,257 | Szegvari et al. | May 19, 1953 |

OTHER REFERENCES

Schildknecht: "Vinyl and Related Polymers," Feb. 20, 1952, pp. 302 and 306.

Indust. and Eng. Chem., January 1950, vol. 42, No. 1, pp. 114–119.

Modern Plastics, March 1950, pp. 111–114, 116, 118 and 120.